INVENTORS
PHILLIP D. QUATTRONE
ROBERT W. STALEY

BY
ATTORNEYS

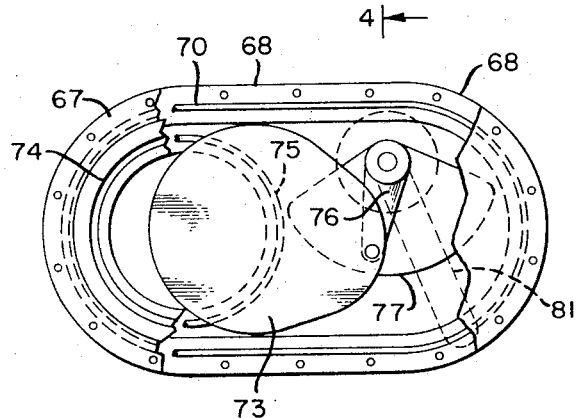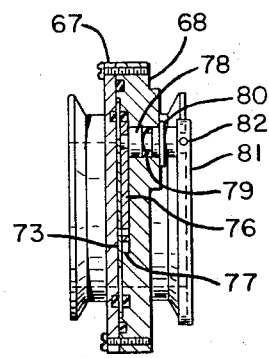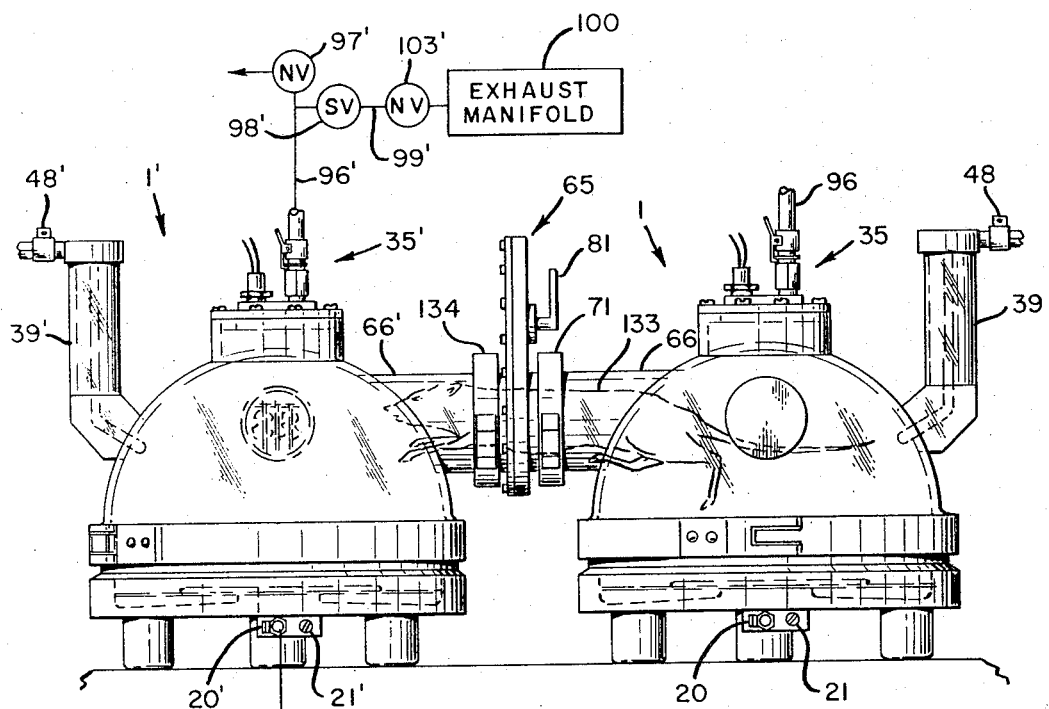

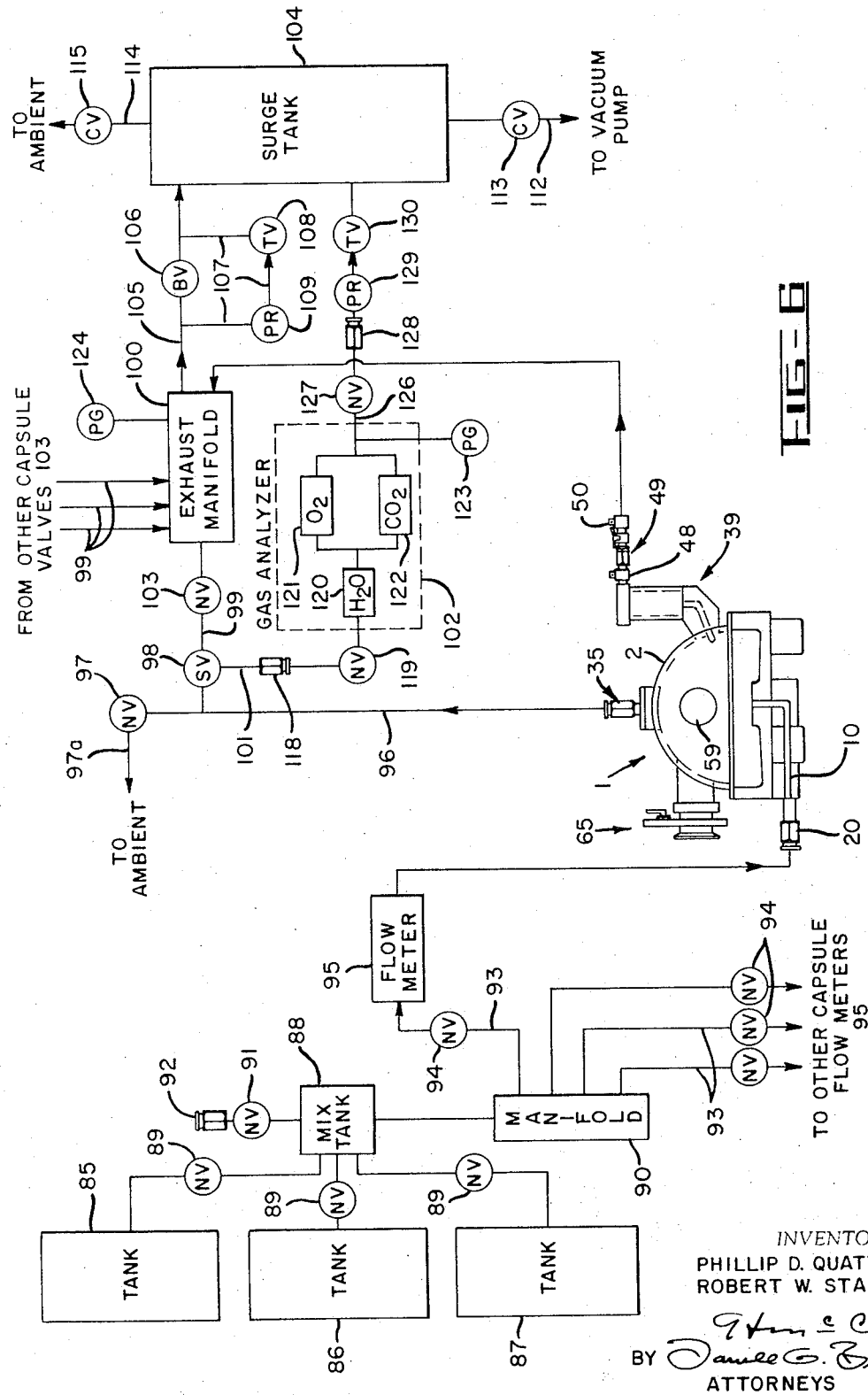

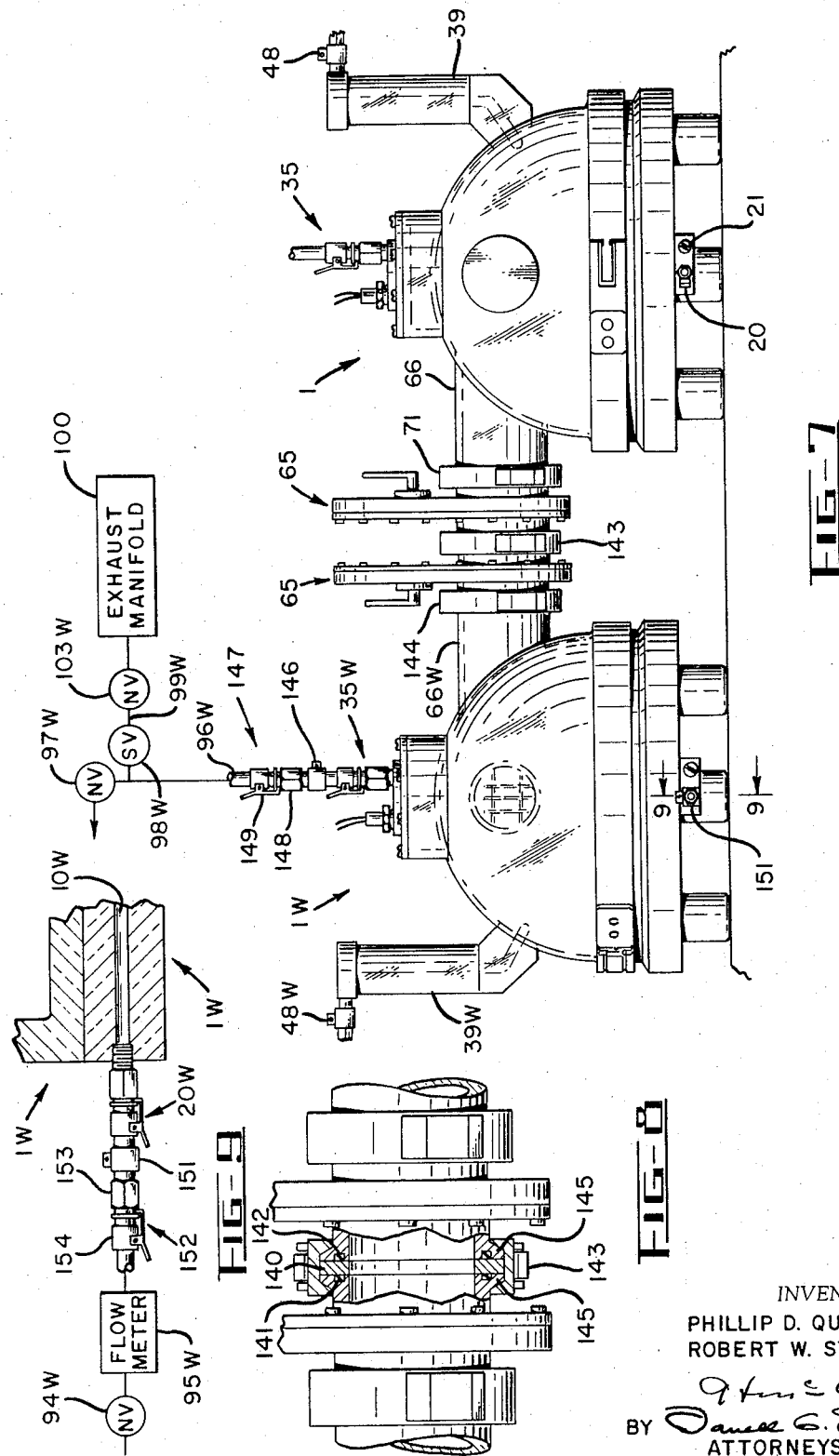

United States Patent Office 3,367,308
Patented Feb. 6, 1968

3,367,308
EXPOSURE SYSTEM FOR ANIMALS
Phillip D. Quattrone, Sunnyvale, and Robert W. Staley, San Jose, Calif., assignors to the United States of America as represented by the Administrator of the National Aeronautics and Space Administration
Filed Apr. 26, 1966, Ser. No. 546,148
25 Claims. (Cl. 119—15)

The invention described herein was made by employees of the United States Government and may be manufactured and used by or for the Government for governmental purposes without the payment of any royalties thereon or therefor.

This invention relates to exposure systems for animals for studying the toxicological aspects or atificial atmospheres.

The gas atmosphere for human subjects in a space craft may differ from air in composition and may not be at atmospheric pressure. A substantial amount of research has been performed on environmental control systems and habitation studies, but a notable information gap still exists concerning the toxicological aspects. The present invention has been made in order to help fill this gap by providing equipment and techniques for laboratory analysis of toxicological aspects associated with artificial atmospheres. The apparatus and techniques which have been developed according to the invention are designed primarily for experimentation with animals. There are a substantial number of problems associated with subjecting animals to a specific atmosphere for an extended period of time and for analyzing the metabolic activity of the animals during the test period. For example, it is necessary to clean the animal's cage periodically and it is also desirable periodically to weigh the animal. In order to perform these functions it is necessary either for a human being to enter the cage or alternatively the animal must be removed from the cage. The system whereby a human enters the cage is objectionable because it subjects the human to pressures and gas compositions which can be harmful. The present systems whereby the animal is removed from the cage are not satisfactory because the animal is then subjected to atmospheric pressure and gas composition, and this exposure superimposed on exposure to the test gas can severely complicate the experimental findings.

Accordingly one of the objects of the present invention is to provide apparatus and methods whereby a test animal can be weighed and his cage cleaned without changing the gas composition or pressure at which the test is being conducted. In this manner a truly chronic or continuous gas exposure can be continued throughout a substantially unlimited length of time.

Another substantial problem in the field is to analyze the animal's metabolic activity in the test environment by respiratory gas analysis, particularly when such environment is at less than atmospheric pressure. One of the prior testing techniques has been to take a sample of the gas from the animal's cage and then pressurize the gas for analysis in a gas analyzer operating at atmospheric pressure. Among the problems caused by this repressurization technique is that of the gas sample size. In order to have sufficient respiratory gas for analysis, a sample collection period of five to ten minutes is required. The analysis then represents an average of the metabolic activity during that time, and continuous monitoring is impossible. In contrast it is another object of the present invention to provide apparatus and methods whereby the exhalations of an experimental animal can be monitored continuously at less than atmospheric pressure so that metabolic variations can be accurately determined. In addition, in the interest of conserving equipment when substantial numbers of animals are individually caged, it is also desirable to be able to use a single gas analyzer, first with one animal and then with another, for short term monitoring. Thus it is an object of the present invention to provide apparatus and methods whereby a gas analyzer can be attached to or removed from the system without disturbing the pressure or composition of the gas in the animal's cage.

There are a number of additional unsolved problems in the field and the solution of these problems is also among the objects of the present invention as will become apparent from the following discussion of additional objects. For example, an additional object of the invention is to provide automatic pressure control systems which will not require continuous monitoring and which will incorporate safety features to prevent damage to the animal in the event of power failure or equipment breakdown.

A further object of the invention is to provide a sysem whereby drinking water can be provided for the animal even though the animal is in a cage at less than atmospheric pressure, so that the animal will be able to obtain sufficient liquid and at the same time the amount of liquid consumption can be easily determined.

An additional object of the invention is to provide a feeder for solid foods which will enable the food to be kept separate from the animal's excreta.

Another object of the invention is to provide a cage construction which will permit the animal's liquid excretion to be kept separate from the solid excretion in order that separate analysis may be made.

By way of brief description an exposure system according to the invention comprises a hermetically sealed test capsule having an inlet connected to a source of gas and an outlet connected to a vacuum system. Suitable valving is provided to obtain the desired pressure and composition of the test atmosphere flowing continuously through the capsule, and to protect an animal in the capsule from sudden pressure change in the event of equipment breakdown or power failure. In addition a gas analyzer and suitable valving are provided whereby the analyzer can be connected to and disconnected from the outlet of the capsule while retaining the test atmosphere flowing continuously through the capsule. An auxiliary capsule is provided together with transfer passage means and valving means whereby the test atmosphere can be obtained in the auxiliary capsule and then the animal can be transferred from the test capsule to the auxiliary capsule; after which the auxiliary capsule can be sealed off from the test capsule and the test capsule can be opened and cleaned. The arrangement is such that the animal is continuously exposed to the test atmosphere throughout the transfer procedure and subsequent cleaning of the test capsule. Similarly a weighing capsule is provided together with transfer passage means and valving means whereby the test atmosphere can be obtained in the weighing capsule; after which the animal can be transfered to the weighing capsule, and the capsule and animal can be weighed together, while retaining the animal continuously exposed to the test atmosphere throughout the transfer and weighing procedure. The test capsule is provided with a sealed drinking tube and a sealed mechanical feeder, and valve means are provided for connecting the top of the drinking tube to the The test capsule is provided with a sealed drinking tube with the interior of the capsule.

The various objects and features of the invention will become more apparent from the following detailed description wherein reference is made to the accompanying drawings in which:

FIGURE 3 is a cross sectional view on the line 3—3 of FIGURE 1 showing a transfer valve for removing the animal from one capsule to another preparatory to weighing or cage cleaning;

FIGURE 4 is a cross sectional view on the line 4—4 of FIGURE 3;

FIGURE 5 is a side elevational view showing two capsules interconnected for transfer of the test animal and showing the animal in the act of transferring from one capsule to the other preparatory to the cage cleaning operation. FIGURE 5 also includes a schematic showing of various line connections;

FIGURE 6 is a block diagram showing the manner in which the desired gas atmosphere is obtained in the capsule and how the respiratory reaction of the animal is analyzed;

FIGURE 7 is a side elevational view including schematic line connections similar to FIGURE 4 but showing two capsules connected together preparatory to the weighing procedure;

FIGURE 8 is a view on slightly enlarged scale showing the middle portion of FIGURE 7 in section; and FIGURE 9 is a partial cross sectional view on the line 9—9 of FIGURE 7 and adding schematic line connections.

Figure 1:
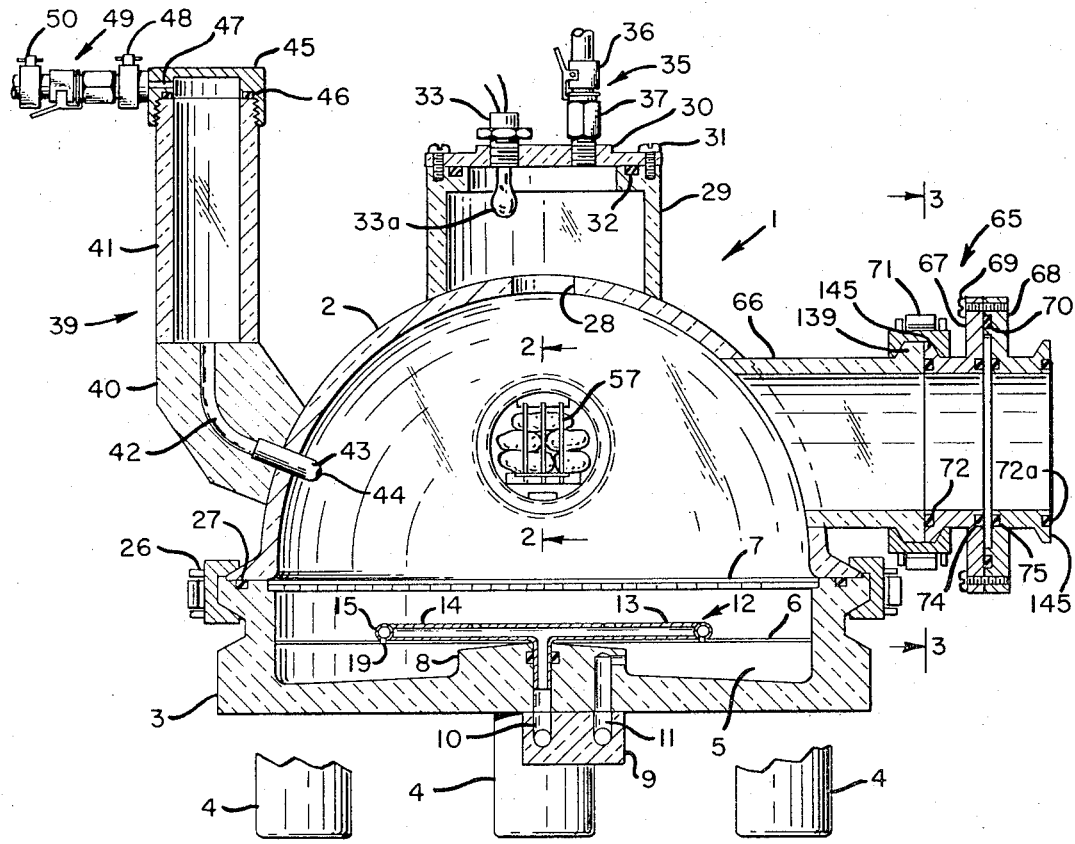
FIGURE 1 is a cross sectional view of a test capsule or cage in which the test animal is placed.

Referring in more detail to the drawings, the test capsule 1 is capable of being entirely closed to form a hermetically sealed unit. The envelope for the capsule is made of clear acrylic plastic so that test personnel can maintain continuous observation of the experimental animal. The capsule is made of an upper dome section 2 and a lower base section 3 both of acrylic plastic. The lower section is provided with three downwardly extending legs 4 and is recessed to provide a urine collection chamber 5. Above the urine collection chamber is mounted a fine screen 6 which will collect solid excreta and a more coarse screen 7 to support the animal. The base 3 is provided with a circular raised section 8 at its center and an associated downwardly depending block 9. A gas inlet passage 10 is provided in the sections 8 and 9, and a normally closed passage 11 is provided so that a gas pressure gauge can be connected to the outer end of passage 11 to check the exact pressure in the capsule. Inserted in the gas inlet passage 10 is a gas distribution ring 12 having four radial spokes 13 and 14 (only two being shown), and a rim 15. The rim 15 is provided with a plurality of spaced openings 19 to convey the inlet gas to the capsule. As seen in FIGURE 5 the outer end of passage 10 is provided with a conventional quick disconnect 20, and the end of passage 11 is closed as by a plug 21.

The upper or dome section 2 is removably connected to the base section 3 by means of a conventional toggle snap ring 26 and the joint is sealed by an O-ring 27. The upper end of the dome section is provided with an aperture 28 so that the test gas can flow completely through the capsule. Mounted above the aperture 28 is a clear arcylic plastic cylinder 29 having a cover plate 30 attached to the cylinder by screws 31 and sealed by an O-ring 32. The cover plate contains a hermetically sealed electrical plug 33 and a thermistor probe 33a to monitor temperature in the capsule. A conventional quick disconnect 35 is also sealed in the cover 30 and comprises a male portion 36 and a female portion 37.

Also mounted on the dome section 2 is a drinking tube 39 which for convenience is made in two sections 40 and 41, both of clear acrylic plastic. The section 41 is a cylinder for containing drinking liquid and is provided with a detachable vertical measuring scale (not shown) to determine quantity of consumption. The section 40 is provided with a passage 42 in which is inserted a nipple 43 having an opening 44 which will permit the animal to obtain liquid. The drinking tube can of course be filled with a liquid diet instead of merely water. The upper end of the drinking tube is hermetically closed with a threaded cap 45 and is sealed by an O-ring 46. The cap 45 includes a passage 47 to which is attached a conventional on-off valve 48, a conventional quick disconnect 49, and a second on-off valve 50, for purposes which will be hereinafter described.

Figure 2:
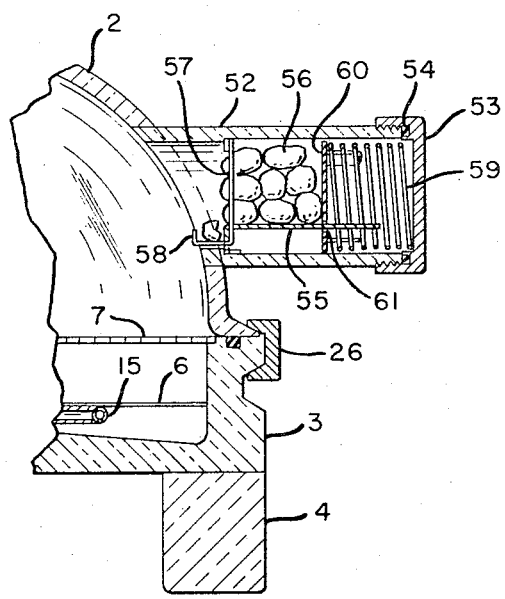
FIGURE 2 is a cross sectional view on the line 2—2 of FIGURE 1 showing the mechanical feeder.

As shown best in FIGURES 1 and 2 a mechanical feeder is also attached to the dome section. The feeder comprises a clear arcylic plastic cylinder 52 and a metal end cap 53 sealed thereon by an O-ring 54. A platform 55 is inserted in the cylinder 52 and serves to support the food pellets 56. The food pellets are prevented from moving freely into the capsule by means of vertical bars 57. A small tray 58 is attached to 55 and 57 for holding a food pellet which the animal has managed to extract between the bars. The food pellets 56 are continuously moved toward the bars by means of a spring 59 and a spring follower 60. The follower 60 includes a slot 61 for receiving and supporting the outer end of the platform 55.

Also connected to the dome section 2 is a transfer passage, and a valve unit indicated generally at 65. The transfer passage comprises a cylindrical transfer tube 66 of clear arcylic plastic. The valve unit is made of metal and has two sections 67 and 68 secured together by screws 69 and sealed by an O-ring 70. The transfer valve unit is connected to the transfer tube 66 by a conventional toggle snap ring 71 and sealed by an O-ring 72. Another O-ring 72a is provided at the right side of the valve unit for sealing the valve unit to another capsule as will be hereinafter described. As shown best in FIGURES 3 and 4 the transfer tube can be closed by a movable valve member 73 which can be moved to completely close or completely open the transfer tube. The valve member 73 slides between two O-rings 74 and 75. Valve member 73 is pivotally connected to an operating crank arm 76 which is received for pivotal movement in a recess 77 in the valve section 68. The crank arm 76 is rigidly connected to a shaft 78 which is sealed in the valve section 68 by an O-ring 79 and is held in place by a snap ring 80. An operating handle 81 is securely attached to the shaft 78 by a pin 82. Thus when handle 81 is turned, it will cause the valve member 73 to be moved either to completely close the transfer tube or completely open the transfer tube.

The operation of the apparatus will now be described with particular reference to FIGURE 6. It will be understood that the animal to be tested such as a rat can be placed in the capsule by opening the valve unit 65 and inserting the animal through the transfer tube 66 and then closing the valve, as will be hereinafter described in detail. The gas environment for the test is first selected. For this purpose any desired number of gas tank sources 85–87 are connected to a mix tank 88 through needle control valves 89. For example, tank 85 can contain oxygen, tank 86 can contain nitrogen and tank 87 can contain water-pumped compressed air. The mix tank is connected to a manifold 90 so that a desired number of capsules can be subjected to the same gas mixture. In order to determine that the desired mixture has been obtained, a needle valve 91 is connected to the mix tank followed by a quick disconnect 92. Thus, a conventional gas analyzer can be connected to the mix tank and, with valve 91 open, the correct mixture can be assured. Then the valve 91 is closed and the analyzer is removed. For each individual capsule the manifold is connected via a line 93 and a needle valve 94 to a flow meter 95. The flow meter 95 is connected to the quick disconnect 20 on the inlet line 10 of the capsule.

The following discussion will first describe the various additional elements and connections in the system and then the operation of the whole system will be described. The quick connect 35 from the outlet of the capsule is connected to a needle valve 97 and also to a solenoid valve 98. The needle valve 97 as is the case with all other needle valves in the system is conventional and provides for obtaining metered flow or completely shuting off the flow. Thus needle valve 97 can meter the flow to atmosphere via an outlet line 97a or can completely close off the passage to atmosphere. Solenoid valve 98 is a conventional three-way valve so arranged that it can alternatively connect line 96 from the capsule to a line 99 to an exhaust manifold or chamber 100 or to a line 101 to a conventional gas analyzer 102. The line 99 to the exhaust manifold contains a conventional needle valve 103 which as in the case of the other needle valves in the system will permit adjustment to obtain the desired flow. The exhaust manifold is connected to a surge tank 104 by a line 105 containing a conventional ball valve 106 which can be either entirely closed or quickly opened various amounts to obtain roughly the desired pressure in exhaust manifold 100 in a quick manner. The ball valve 106 is by-passed by a line 107 which contains a conventional toggle type on-off valve 108 and a conventional pressure regulator 109 whose function will be hereinafter described.

The surge tank 104 is connected by a line 112 to a conventional vacuum pump. A conventional one-way check valve 113 is provided in the line 112 and is arranged so that it will open only to permit flow from the surge tank to the vacuum pump. Thus if the vacuum pump breaks down, the check valve will automatically close, and the low pressure in the surge tank will prevent the capsule from being pressurized in a rapid manner. In addition, the surge tank 104 is provided with a line 114 to the ambient atmosphere via a conventional one-way check valve 115. Check valve 115 is arranged to open only to permit flow from the surge tank to the ambient atmosphere so that in the event of breakdown of the vacuum pump the surge tank will first act to slowly increase the pressure in the capsule but will not allow the pressure in the capsule to build up materially beyond atmospheric because the valve 115 will open to vent the system to ambient atmosphere.

As previously described the solenoid valve 98 is not only arranged to connect line 96 to line 99 but also to connect line 96 to line 101. It should be understood that these connections are alternatively separate and are not simultaneous. Line 101 is connected by a quick disconnect 118 to the gas analyzer 102 through a conventional needle valve 119. By way of example, the gas analyzer is of the type which is provided with a water vapor analyzing element 120, an oxygen analyzer 121 and a carbon dioxide analyzer 122. A conventional pressure gauge 123 is provided for the gas analyzer and a similar pressure gauge 124 is provided for the exhaust manifold so that the respective pressures in these units can be continuously monitored. The gas analyzer is connected to the surge tank 104 by a line 126. The line 126 contains a conventional needle valve 127, quick disconnect 128, pressure regulator 129 and on-off toggle valve 130.

Reference will now be made again to the operation of the system. If the exposure system is to be operated at a pressure below that of ambient pressure, the exhaust manifold 100 must be adjusted to the desired pressure level before any capsule exhaust 96 is connected to it. With valves 106, 108 and 130 closed, the vacuum pump is energized. The surge tank 104 is evacuated, and then ball valve 106 is opened slightly to quickly adjust the pressure of the exhaust manifold 100 to approximately the desired level. The ball valve 106 is closed, toggle valve 108 is openend, and the pressure regulator 109 is adjusted to control the pressure in the exhaust manifold 100. After all the exposure capsule exhausts 96 are connected to the exhaust manifold 100, the pressure regulator 109 must be adjusted slightly to take care of the increased gas flow. The pressure regulator 109 will then control the exhaust manifold pressure as read on gauge 124 automatically throughout the exposure period. It will be recalled that establishing the correct mixture in tank 88 has been performed and the valve 91 is closed. After the exhaust manifold has been subjected to reduce pressure as just described, the experimental animal is placed in the capsule 1 through the valve 65, and then valve 65 is closed. Next the valve 94 to the flow meter is opened so that the gas mixture enters the capsule, quick disconnect 20 having first been connected to inlet line 10 of the capsule. When the gas composition under test is different from air, the capsule is purged by opening valve 97 to obtain a high ventilatory flow rate of approximately 1.5 liters per minute for about ten minutes. During this time the exhaust manifold 100 remains connected to the vacuum system, and valve 103 is closed.

After the purging operation, the gas flow rate to inlet line 10 is decreased by valve 94 to the desired level, valve 97 is closed, and valve 103 to the exhaust manifold 100 is opened, valve 98 being already open to connect lines 96 and 99. Valve 103 is opened slowly to control the rate of change of pressure in the capsule 1 within desired limits. When the capsule 1 and the exhaust manifold pressures are equilibrated, valve 103 is fully open. It should be recalled that when the needle valve 103 is opened, the solenoid valve 98 is positioned to connect line 96 with line 99. Line 96 is not connected to line 101 to the gas analyzer at this time.

At this point it should be noted that water in the drinking tube 39 would be drawn into the capsule if some solution were not provided. The solution is to open the valves 48 and 50 between the drinking tube and the exhaust manifold prior to connecting the capsule to the low pressure in the exhaust manifold 100. Thus, when the capsule is connected to low pressure, the pressure above the water in the drinking tube will be slightly less than that in the capsule and the water will not flow out of the nipple 43. More specifically while the valve 103 is being slowly opened to reduce the pressure in the capsule, the valves 48 and 50 are adjusted so that gas bubbles up through the water in the drinking tube in order to be certain that the pressure above the water is slightly less than in the capsule. This reduced pressure counteracts the hydrostatic head and prevents the water from flowing out of the nipple. After the drinking tube has been equilibrated with the low pressure in the capsule, the valves 48 and 50 are closed.

When it is desired to analyze the respiratory condition of the animal, the gas analyzer is connected to the system by means of the quick disconnects 118 and 128. Then before opening solenoid valve 98 to the gas analyzer, the toggle valve 130 and needle valves 119 and 127 are opened to the gas analyzer. Then, through the function of the pressure regulator 129, the gas analyzer is brought to approximately the same pressure as the exhaust manifold. However since the resistance to gas flow in the analyzer is normally greater than in the capsule exhaust lines, the analyzer is evacuated to a slightly lower pressure than the exhaust manifold in order to maintain the capsule pressure constant. After the proper pressure is established in the analyzer as indicated by the pressure gauge 123, solenoid valve 98 is energized to disconnect line 96 from line 99 and instead connect line 96 to line 101 for the analyzer. In this manner the respiratory reaction of the animal in capsule 1 can be monitored as long as desired without changing the atmosphere to which the animal is exposed. Since gas analyzer are expensive items of equipment, the arrangement has been designed so that the analyzer can be used intermittently for a number of capsules and thus avoid the need for a gas analyzer for each capsule. When it is desired to discontinue analysis for one capsule and analyze another capsule, the solenoid valve 98 is deenergized to connect line 96 to line 99 to the exhaust manifold 100, and to disconnect line 96 from line 101 to the analyzer. Then needle valve 119 is closed, the 118 quick disconnect 118 is uncoupled, and the analyzer can be connected to another capsule solenoid valve 98.

It should be understood that one of the intentions of the invention is to make simultaneous comparative analysis of the reactions of animals to different types of atmospheres, and further to test more than one animal at each type of atmosphere. In FIGURE 6 the arrangement is shown for testing other animals in separate capsules. However, only one of the capsules is shown in detail. Lines 93 at the bottom of FIGURE 6 are connected to the other capsules which are not shown in detail. It should be understood that the system for each capsule includes a line 93, a needle valve 94, a flow meter 95, a line 96, a needle valve 97, a solenoid valve 98 and a needle valve 103. Thus the lines 99 at the top of FIGURE 6 come to the exhaust manifold from their respective needle valves 103. At the same time that this set of capsules is being tested with the gas mixture of FIGURE 6, other sets of capsules can be connected to other exhaust manifolds and different mix tanks which can provide different gas mixtures and different pressures.

In order to operate capsules at atmospheric pressure, needle valve 103 is closed and valve 97 to atmosphere is kept open. During periods when analysis is not being made, solenoid valve 98 is closed to line 101. When analysis is desired, the gas analyzer 102 is adjusted to a pressure slightly below that of the capsule as previously described. Then valve 98 is opened to line 101 and valve 97 is thereafter closed. When the analysis is completed, valve 97 is opened to atmosphere, and valve 98 is closed to line 101. For operation at ambient the valves 48 and 50 for the watering tube are simply retained in closed condition.

When it is desired to clean the cage of an animal without altering the atmosphere to which he is being exposed, an auxiliary capsule 1' is attached to the capsule 1 in which the animal has been undergoing tests, as shown in FIGURE 5. The auxiliary capsule 1' is constructed the same as the test capsule 1, and the other primed numbers in FIGURE 5 designate elements which are constructed the same as elements designated by the same numbers in the other figures without the prime notation. FIGURE 5 shows the animal, a rat 133 for example, in the act of transferring from the original test capsule 1 to the auxiliary capsule 1'. The arrangements for preparing for the transfer will now be described. When it is desired to transfer the animal, the auxiliary capsule 1' is connected to the free end of the transfer valve 65 by means of a conventional toggle type snap ring 134 as shown in FIGURE 5, with the O-ring 72a of FIGURE 1 positioned between valve 65 and the transfer tube 66'. Thus, the snap ring 134 connects the end of the transfer cylinder 66' to the end of the transfer valve unit on the test capsule 1 which is normally free and open as shown at the extreme right in FIGURE 1, the closure for the valve unit being accomplished by the valve member 73. It will be understood that the transfer valve can be attached to the capsule 1 in any rotational position and with the handle 81 toward or away from the capsule. In FIGURE 5, as contrasted to FIGURE 1, the valve 65 is shown positioned vertically and with the handle toward the capsule 1. At the time the connection is made by toggle snap ring 134, the valve member 73 is closed, and before opening valve member 73 the auxiliary capsule 1' is subjected to exactly the same atmosphere as in the test capsule 1. More specifically, the inlet to the auxiliary capsule is attached by a quick disconnect 20' to a flow meter 95', a needle valve 94' and thence to the manifold 90 which is also connected to the test capsule 1. The outlet line 96' from the auxiliary capsule is connected to a needle valve 97' for purging to atmosphere, and is connected through a solenoid valve 98' and a needle valve 103' to the exhaust manifold 100, to which the test capsule is also connected. After the connections have been made the test capsule is purged by opening valve 97' with valve 103' closed, after which, valve 97' is closed and valve 103' is opened to connect the auxiliary capsule to the exhaust manifold 100, solenoid valve 98' being positioned to connect lines 96' and 99' during this procedure.

The drinking tube 39' in the auxiliary capsule contains water, and the procedure previously described must be followed in order to keep the water in the tube. It will be understood that the drinking tube 39' is connected to the exhaust manifold in the same manner shown for drinking tube 39 in FIGURE 6.

After the auxiliary capsule has been provided with the desired atmosphere, the valve member 73 in valve unit 65 is opened and the rat 133 is transferred through the transfer cylinders 66 and 66' into the auxiliary capsule, where he remains exposed to exactly the same atmosphere at which he was being tested. Then valve 65 is again closed, and the snap ring 71 is removed so that the test capsule 1 can be separated from the auxiliary capsule. Prior to disconnecting the test capsule 1 from the exhaust system its valve 103 is closed to avoid exposing the exhaust manifold to the ambient atmosphere. Next, needle valve 94 is closed to separate manifold 90 from the ambient atmosphere. Needle valve 97 is then opened to equilibrate the capsule 1 to ambient pressure. The quick disconnects 20, 35, and 49 are separated from capsule 1, and the capsule 1 can then be removed for dismantling and cleaning. Dismantling is easily accomplished by removing the toggle type snap ring 26.

The experimental animals are transferred once daily to a clean auxiliary capsule, and this procedure is performed for each animal throughout the exposure period. After an elapsed time of twenty-four to thirty hours, during which the test capsule 1 is cleaned and reassembled, the test capsule is reconnected to the system by attaching the quick disconnects 20, 35, and 49, and the capsule is also reconnected to the auxiliary capsule by attaching snap ring 71. Then the valves 94 and 97 are reopened to purge the test capsule as previously explained. After the purging operation, the valve 97 is closed and 103 is opened to reconnect the test capsule 1 to the vacuum system. The drinking tube equilibration is performed as before. Next the valve 65 is opened and the rat is returned from the auxiliary capsule 1' to the test capsule 1, after which the valve 65 is again closed. Then the auxiliary capsule 1' is disconnected at toggle ring 134 and can be removed from the system after first closing valves 103' and 94'.

Next the procedure for weighing the test animal will be described. The arrangement for accomplishing the weighing is shown in FIGURES 7–9. The procedure for accomplishing weighing includes of course the test capsule 1 from which the animal is to be moved and in addition it includes a weighing capsule 1w. In FIGURES 7–9 the reference numbers followed by the notation "w" designate parts which are structurally the same as parts designated by the same numbers in other figures without the designation "w." The weighing capsule 1w is identical to the test capsule 1 and to the auxiliary capsule 1' except for the type of fittings required for the inlet to the capsule, the type of fittings required for the outlet of the capsule, and the transfer valving means for connecting the weighing capsule to the test capsule. There is no need for water in the weighing capsule, and valve 48w is not connected to the manifold 100. Instead valve 48w is simply kept closed. Proceeding to the transfer valving arrangement it will be seen from FIGURE 7 that two tranfer valves 65 are employed. As shown in FIGURE 8 the means for interconnecting the two transfer valves 65 includes a spacing ring 140 and O-rings 141 and 142. One reason for employing spacing ring 140 is in order to provide a backing surface against which the O-rings 141 and 142 can seal. The two transfer valves 65 are connected by a toggle type snap ring 143, and the transfer valve on the left of FIGURE 7 is connected to the weighing capsule 1w by toggle type snap ring 144 which is identical to snap ring 71. An additional purpose for the spacer ring 140 is to permit snap ring 143 to be identical with the snap rings 71 and 144. More specifically, as shown in FIGURE 1 a flange 139 on the end of the transfer cylinder 66 being of plastic is wider than the flanges 145 of metal on the end of the valve unit 65. Thus, if two valve unit flanges were butted directly together a snap ring of the type 71 would be too wide. As shown in FIGURES 1 and 5 the test capsule 1 and the auxiliary capsule 1' require only single quick disconnect 35, and no valve. In contrast the weighing capsule 1w requires a conventional on-off valve 146 and a conventional quick disconnect 147, in addition to the quick disconnect 35w. As shown in FIGURE 7 the quick disconnect 147 includes a female portion 148 and a male portion 149.

Similarly, as shown in FIGURE 9, the inlet to the weighing capsule includes a conventional on off valve 151 and a quick disconnect 152 in addition to the quick disconnect 20w. The quick disconnect 152 includes a female portion 153 and a male portion 154.

In order to weigh an animal which has been undergoing test in the capsule 1, the weighing capsule 1w is connected to the capsule 1 as shown in FIGURE 7. At this stage the valve 65 on the right in FIGURE 7 is closed and the valve 65 on the left is open. It will be seen from FIGURE 7 that the line 96w from the weighing capsule goes to a needle valve 97w to the ambient atmosphere and through a needle valve 103w to the exhaust manifold 100. In FIGURE 9 it will be seen that the inlet to the weighing capsule goes to the flow meter 95w and a needle valve 94w. The procedure is to close valve 103w, open valve 97w, open the outlet valve 146, open the inlet valve 151, open needle valve 94w, and purge the weighing capsule. Next the valve 97w is closed and the valve 103w is open to expose the weighing capsule 1w to exactly the same atmosphere as in the test capsule. At this point the transfer valve 65 on the right in FIGURE 7 is opened, and the animal is transferred from the test capsule to the weighing capsule. Then both of valves 65 in FIGURE 7 are closed. In this way the test capsule 1 is never exposed to ambient atmosphere and remains on the exhaust system so that it need not be repurged and reconnected later when the animal is returned after being weighed. After the valves 65 have been closed, the snap ring 143 is removed. Then valves 103w and 94w are closed simultaneously. Next the inlet valve 151 and the outlet valve 146 are simultaneously closed so that the test atmosphere will be trapped in the weighing capsule. Then the quick connect units 147 and 152 are separated by removing the male portions 149 and 154 respectively. The weighing capsule unit is now completely separated from any other part of the line which might influence the weighing procedure. The separated capsule unit which contains the animal is weighed, and knowing the weight of the unit without the animal, the animal's weight can be determined. Next the weighing capsule 1w is reconnected to the test capsule 1 by inserting the spacer 140 and attaching the snap ring 143. The inlet and exhaust lines are reconnected to the weighing capsule, valves 146 and 151 are open, valve 103w is opened, and inlet valve 94w is opened and adjusted to regulate the gas flow rate. The transfer valve 65 on the left is then opened. Next the valve 65 on the right in FIGURE 7 is opened and the animal is returned to the test capsule. Both valves 65 in FIGURE 7 are then closed, and the weighing capsule can be separated from the test capsule by removing the snap ring 143. The weighing capsule can then be disconnected from the system or connected to another capsule.

An exposure system constructed according to the invention is capable of operation over a range of pressures for the gas in the test capsule from 150 to 760 millimeters of mercury absolute. The system has been operated at reduced pressure of 450 millimeters of mercury absolute for a period of sixty-four days with no apparent operational problems.

Although specific details of the present invention are shown and described herein, it is to be understood that modifications may be made therein without departing from the spirit and scope of the invention as set forth in the appended claims.

What is claimed is:

1. The method of weighing an animal exposed to a test atmosphere in a hermetically sealed capsule while continuing to expose the animal to said test atmosphere during weighing, said test capsule being connected to a gas flow system for flowing said atmosphere continuously through said test capsule, said method comprising connecting a hermetically sealed weighing capsule to said test capsule through two transfer valves in series between said capsules with the valve adjacent said test capsule in closed position, connecting said weighing capsule to said system through inlet and outlet valves, producing said test atmosphere in said weighing capsule, transferring said animal from said test capsule to said weighing capsule through both of said transfer valves, closing both of said transfer valves, separating said weighing capsule from said test capsule between said two transfer valves, closing said inlet and outlet valves, disconnecting said inlet and outlet valves from said system and then weighing said weighing capsule and the animal therein as a unit.

2. The method as claimed in claim 1 further comprising after said weighing reconnecting said weighing capsule to said test capsule between said valves, opening both of said valves, returning said animal from said weighing capsule to said test capsule through said transfer valves, closing the transfer valve adjacent said test capsule, and then separating said weighing capsule from said test capsule at a point between said transfer valves.

3. The method as claimed in claim 1 wherein the pressure of said test atmosphere is below the ambient atmospheric pressure.

4. The method of providing liquid for an animal in a hermetically sealed capsule having a watering tube delivering downwardly through a nipple from which liquid will not flow under the force of gravity, the end of said nipple being in said capsule and the pressure in said capsule being less than atmospheric, said method comprising equilibrating a hermetically sealed volume above said liquid with the inside of said capsule.

5. An exposure system for an animal comprising a source of gas, a hermetically sealed test capsule having an inlet connected to said source through a valve, said capsule having an outlet line, and exhaust chamber connected to said outlet line through a three-way valve, said three-way valve being selectively operable to connect said outlet line to said exhaust chamber or connect said outlet line to a supplemental line, a closable valve between said three-way valve and said exhaust chamber, a vacuum pump connected to said exhaust chamber, a surge tank connected between said exhaust chamber and said vacuum pump, and one-way check valve between said surge tank and said vacuum pump and opening toward said vacuum pump.

6. An exposure system for an animal as claimed in claim 5 further comprising a closable valve to ambient atmosphere and connected to said outlet line.

7. An exposure system for an animal as claimed in claim 5 further comprising a surge tank connected between said exhaust chamber and said vacuum pump, and a one-way check valve between said surge tank and the ambient atmosphere and opening toward the ambient atmosphere.

8. An exposure system as claimed in claim 5 further comprising a closable valve connected between said exhaust chamber and said vacuum pump.

9. An exposure system as claimed in claim 5 further comprising a gas analyzer connected between said supplemental line and said vacuum pump, and a closable valve between said gas analyzer and said vacuum pump.

10. An exposure system as claimed in claim 5 further comprising a liquid feeder connected to said test capsule, and a line connecting the upper end of said liquid feeder to said exhaust chamber.

11. Apparatus for exposing an animal to a test atmosphere comprising a hermetically sealed test capsule having inlet and outlet openings for gas flow therethrough, a passage for transferring an animal to and from said capsule, a transfer valve hermetically sealed to said capsule and having a transfer opening aligned with said transfer passage, a movable member in said valve, and means for moving said movable member between one position in which said transfer opening is open to said transfer passage and another position in which said transfer opening is hermetically sealed.

12. Apparatus as claimed in claim 11 further comprising a hermetically sealed auxiliary capsule having inlet and outlet openings for gas flow therethrough, and said auxiliary capsule having a transfer passage connected to said transfer valve on the opposite side of said movable member from said first-named capsule.

13. Apparatus as claimed in claim 11 further comprising a hermetically sealed drinking tube extending upwardly from said capsule and having a drinking opening in said capsule, an outlet passage for said drinking tube adjacent the top thereof, and valve means for opening and closing said outlet passage.

14. Apparatus as claimed in claim 11 further comprising a feeder tube for solids hermetically sealed to said capsule and hermetically closed at its outer end, a partly open door at the inner end of said feeder tube, and spring means for forcing food in said feeder tube toward said door.

15. Apparatus as claimed in claim 11 further comprising a hermetically sealed weighing capsule having inlet and outlet openings for gas flow therethrough, said weighing capsule having a transfer passage hermetically sealed thereto, a second transfer valve hermetically sealed to said transfer passage of the weighing capsule and having a transfer opening aligned with said transfer passage of the weighing capsule, a movable member in said second transfer valve, and means for moving said movable member in the second transfer valve between one position in which said transfer opening in the second valve is open to said transfer passage in the weighing capsule and another position in which said transfer opening in the second valve is hermetically sealed, and releasable means hermetically sealing said two transfer valves together between said movable members in said two transfer valves.

16. Apparatus as claimed in claim 15 in which said means sealing said two transfer valves together comprises a spacing ring between said two valves aligned with the transfer openings of said two valves, and a sealing ring between said spacing ring and the transfer valve on each side thereof.

17. A hermetically sealed capsule for exposing an animal to a test atmosphere, comprising a lower portion and an upper portion, releasable means hermetically sealing said portions together, said lower portion having a bottom with an inlet passage therein, a hollow gas diffusion ring connected to the inner end of said inlet passage and positioned in said capsule, said diffusion ring having outlet openings in the bottom thereof and positioned above said bottom of said lower portion, and an animal-supporting screen positioned in said capsule above said diffusion ring.

18. Apparatus for exposing an animal to a test atmosphere comprising a hermetically sealed test capsule having inlet and outlet openings for gas flow therethrough, a drinking tube extending upwardly from said capsule and having a drinking opening in said capsule, said drinking tube being hermetically sealed to said capsule, an outlet passage for said drinking tube adjacent the top thereof, and valve means for opening and closing said outlet passage.

19. Apparatus for exposing an animal to a test atmosphere and analyzing the animal's respiratory reactions to the test atmosphere, comprising a vacuum pump, a surge tank connected to said vacuum pump, an exhaust chamber, an outlet line connecting said exhaust chamber to said surge tank, a closable valve in said outlet line between said surge tank and said exhaust chamber, a gas analyzer, an outlet line connecting said analyzer to said surge tank, a closable valve in said outlet line for said analyzer, an inlet line common to said exhaust chamber and said analyzer, valve means for selectively connecting said common line to said exhaust chamber or to said analyzer, means for disconnecting said analyzer from said common line on the analyzer side of said valve means, and means for disconnecting said analyzer from said surge tank on the analyzer side of said valve in said outlet line of the analyzer.

20. Apparatus as claimed in claim 19 further comprising a hermetically sealed capsule having an outlet connected to said common line, a source of test gas, and said capsule having an inlet line connected to said source of gas.

21. Apparatus as claimed in claim 20 further comprising a closable valve to ambient atmosphere connected to said common line in the flow path between said capsule and said selective valve means.

22. Apparatus for exposing an animal to a test atmosphere comprising a hermetically sealed test capsule having inlet and outlet openings for gas flow therethrough, a transfer valve hermetically sealed to said capsule and having an animal passageway therethrough, a movable member in said transfer valve, and means for moving said movable member between one position in which said transfer passageway is open and another position in which said passageway is hermetically sealed.

23. Apparatus as claimed in claim 22 further comprising a first quick disconnect connected to said outlet opening, a closable valve connected to said first quick disconnect, and a second quick disconnect connected to said closable valve.

24. Apparatus as claimed in claim 22 further comprising a first quick disconnect connected to said inlet opening, a closable valve connected to said first quick disconnect, and a second quick disconnect connected to said closable valve.

25. Apparatus as claimed in claim 22 further comprising a drinking tube hermetically sealed to said capsule and having an exhaust opening adjacent its upper end, a first closable valve connected to said exhaust opening, a quick disconnect connected to said first closable valve, and a second closable valve connected to said quick disconnect.

References Cited

UNITED STATES PATENTS

| | | | |
|---|---|---|---|
| 1,224,180 | 5/1917 | Lake | 128—204 |
| 2,244,082 | 6/1941 | Reyniers | 128—1 |
| 2,373,333 | 4/1945 | St. Onge | 128—204 X |
| 2,448,546 | 9/1948 | Plemel et al. | 128—204 |
| 2,703,570 | 3/1955 | Young | 128—1 |
| 2,705,489 | 4/1955 | Trexler | 128—1 |
| 3,000,377 | 9/1961 | Tolbert et al. | 128—2.07 |
| 3,010,220 | 11/1961 | Schueller | 128—1 X |
| 3,302,615 | 2/1967 | Tietue | 119—15 |
| 3,304,913 | 2/1967 | Nesher | 119—15 |

ALDRICH F. MEDBERY, *Primary Examiner.*